July 28, 1925.  W. O. JOURNEAY  1,547,759
TOOL JOINT
Filed May 28, 1921   2 Sheets-Sheet 1
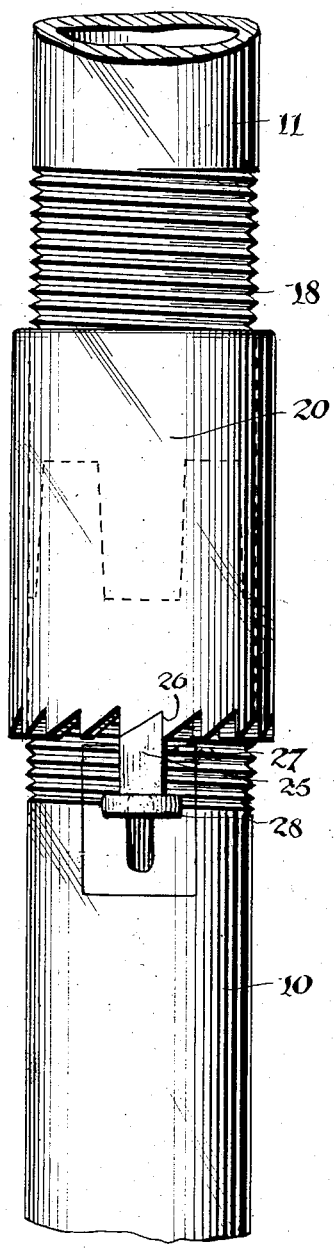
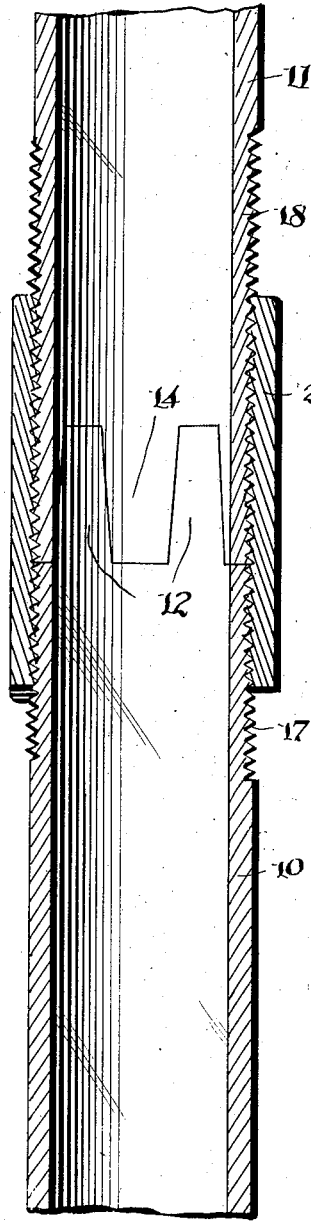
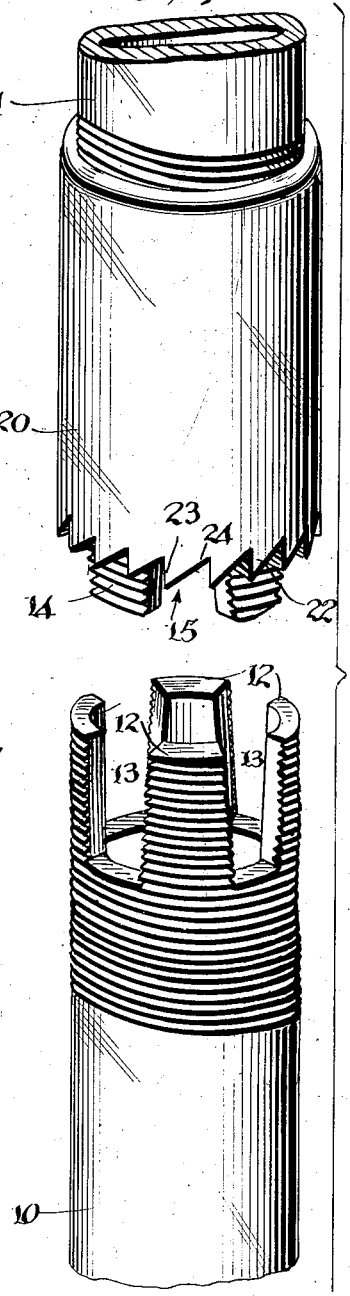
INVENTOR
W. O. Journeay,
BY
ATTORNEYS

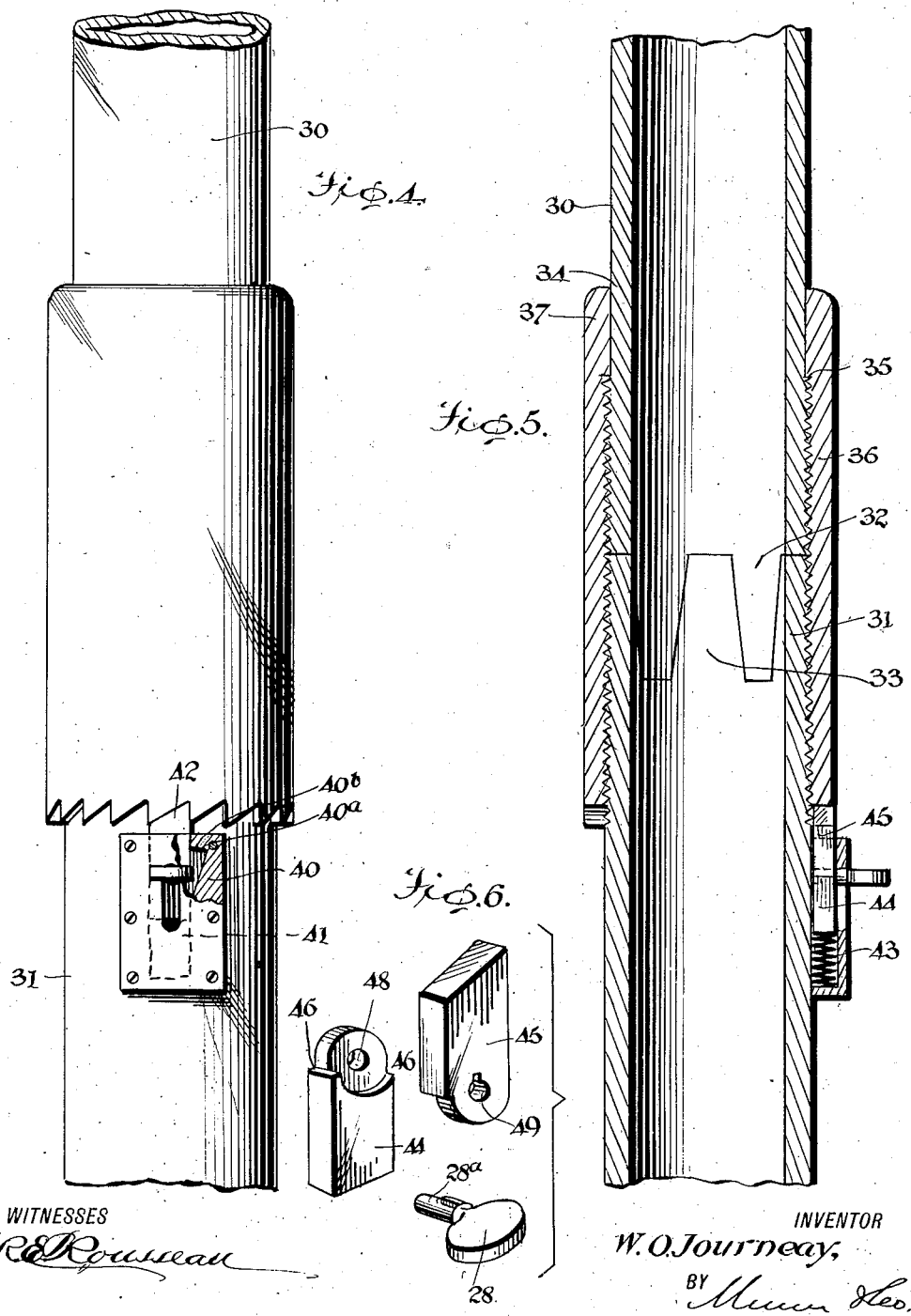

Patented July 28, 1925.

1,547,759

UNITED STATES PATENT OFFICE.

WILLIAM O. JOURNEAY, OF HOUSTON, TEXAS.

TOOL JOINT.

Application filed May 28, 1921. Serial No. 473,514.

*To all whom it may concern:*

Be it known that I, WILLIAM O. JOURNEAY, a citizen of the United States, and a resident of Houston, in the county of Harris and State of Texas, have invented certain new and useful Improvements in Tool Joints, of which the following is a specification.

The present invention relates to improvements in tool joints for the rotary drill stems of well drilling machinery and has for its object to provide an improvement of this character which relieves the threads embodied in organizations of this character of the heavy strain of twisting and grinding, which prevent backing off of the connections and which in general avoids accidents in well drilling, and which is of simple and durable construction, reliable in operation, and easy and inexpensive to manufacture.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1 is a fragmentary view in elevation of the invention;

Figure 2 is a sectional view thereof;

Figure 3 is a perspective view of the parts prior to assembly;

Figure 4 is an elevational view of a slightly modified form of my invention;

Figure 5 is a sectional view thereof; and

Figure 6 is an enlarged detail view of the locking detent.

Referring to the drawings wherein for the sake of illustration is shown the preferred embodiment of the invention, the numeral 10 designates a lower pipe section adapted for connection, preferably a screw connection, with the drill stem. An upper pipe section 11 is provided and is organized with the lower pipe section in a manner which will hereinafter be more fully described. The pipe sections preferably consist of extra heavy steel pipe.

The pipe sections 10 and 11 are arranged coaxial with respect to each other and abut each other in end to end relation. The section 10 is provided with a plurality, preferably four, arcuate and longitudinally extending tongues 12. The tongues 12 are spaced circumferentially and are formed on the same radius as the pipe section 10 from which they extend. They are widest at the point of their juncture with the pipe section and taper toward their outer or free ends. The tongues 12 being thus arranged define grooves or sockets 13 for a purpose which will hereinafter more fully appear. The section 11 is provided with similar tongues 14 which in the assembly are staggered with respect to the tongues 12 and received in the grooves 13. The tongues 14 define grooves 15 which accommodate the tongues 12. The tongues 12 and 14 are correspondingly formed and snugly interfit so that in the assembly as most clearly shown in Figure 2, they make up a complete circular wall approximating in strength the solid wall of the pipe sections themselves and taking up all torque and other forces and stresses acting about the axis of the sections.

The exterior of the tongues 12 and the exterior of the tongues 14 as well as the exterior of the section 10 and the exterior of the section 11 adjacent the meeting ends of the sections are threaded with a left handed thread and the arrangement is such that the threads of the sections and the tongues constitute a single continuous left handed thread. A sleeve-collar 20 having internal threads 21 is operatively engaged with the threads of the sections and in the assembly this sleeve-collar engaged with the threads of both sections and overlap both sections to a considerable extent, the tongues 12 and 14 being completely embraced by the sleeve-collar in the assembly. Preferably the sleeve-collar is constructed of extra heavy metal. The lower end of the sleeve collar is formed with teeth 22 having vertical faces 23 and inclined faces 24 whereby the teeth constitute a ratchet. A spring latch 25 cooperates with the teeth 22 of the ratchet. The spring latch is operated by a button 28 so that when the button is pressed down and turned to the right the spring latch is first released from engagement with the teeth 22 and is then locked out of engagement.

In assembling the tool joint the section 10 is first threaded on the drill stem and the sleeve-collar 20 is run up on the section 11. The sections 10 and 11 are then associated with each other so that the tongues 12 and 14 interfit. The sleeve collar is next turned until its threads are engaged with the threads of both sections and so that it embraces the tongues 12 and 14 and the spring latch 25 is engaged with the ratchet of the sleeve-collar. In order to disassemble the tool joint it is only necessary to press the button 28 downwardly and turn it to the right which locks it in released position and permits the sleeve-collar 20 to be run up on the section 11 so as to permit the disassociation of the sections of the joint.

In operation the joint is effective to efficiently transmit torque in the section 10 to the section 11, and thus to the drill tongue and the transmission of this torque is carried out by the tongues 12 and 14 so that no destructive stresses are set up in the threads and other joints not adapted to bear the same. Moreover, it is impossible to back off the connection for the spring latch 25 locks the sleeve-collar against displacement and the drill stem may be rotated either to the right or to the left with equal efficiency and with equal safety.

In the embodiment of the invention shown in Figures 4 and 5 the pipe sections are designated at 30 and 31 and these sections carry tongues 32 and 33 similar in all respects to the tongues of the embodiment previously described. The section 30 has its upper portion reduced, as at 34, and presents a shoulder 35. The sleeve collar designated at 36 is constructed previously as in the other embodiment except that its upper end is heavier and formed to provide a shoulder 37 which engages the shoulder 35 of the section 30 in the assembly. The lower end of the sleeve collar is provided with a ratchet as in the foregoing embodiment and the spring latch which is identical in both forms of the invention cooperates with this ratchet. This spring latch includes a frame 40 having a longitudinal slot 41 which slidably receives the locking detent 42 and which accommodates a coil spring 43 which urges the locking detent to locking position. The locking detent includes sections 44 and 45 having shoulders 46 and 47 limiting the movement of the sections with respect to each other in one direction and having openings 48 and 49 adapted to receive a pin $28^a$ of the button 28. In this manner the section 45 may partake of swinging movement in one direction with respect to the other section 44. This movement being only permitted when the locking detent has been withdrawn to within the frame 40 and it being then permitted by virtue of the extension $40^a$ of the slot of the frame. This extension $40^a$ of the slot presents a shoulder $40^b$ which engages the upper section 45 of the detent to lock it within the housing when the button has been pressed downwardly and turned to move the section 45 into engagement with the shoulder.

I claim:

A spring latch adapted for use with a tool joint having a sleeve collar provided with teeth and comprising a frame having a longitudinal slot, a locking detent mounted within the frame, a coil spring engaged with the locking detent and urging the same into engagement with the teeth of the sleeve collar, means for retracting the locking detent, said locking detent having a swinging section and said frame having a shoulder engageable with the swinging section for holding the locking detent in retracted position and out of engagement with the teeth of the sleeve collar, the said swinging section being selectively engageable with the teeth of the sleeve collar or with said shoulder.

WILLIAM O. JOURNEAY.